A. G. BELL.
GENERATING ELECTRIC CURRENTS.

No. 181,553.  Patented Aug. 29, 1876.

UNITED STATES PATENT OFFICE.

ALEXANDER GRAHAM BELL, OF BOSTON, MASSACHUSETTS.

IMPROVEMENT IN GENERATING ELECTRIC CURRENTS.

Specification forming part of Letters Patent No. 181,553, dated August 29, 1876; application filed August 12, 1876.

*To all whom it may concern:*

Be it known that I, ALEXANDER GRAHAM BELL, of Boston, Massachusetts, have invented certain new and useful Improvements in Telegraphy, of which the following is a specification:

My invention consists of a method of and apparatus for inducing a continuous current of electricity upon a telegraphic circuit by the rotatory motion of permanent magnets, or other bodies capable of inductive action, thus obviating the necessity of using voltaic batteries.

It has long been known that a straight bar of magnetized steel can be made to rotate upon its axis by passing a current of electricity through it from the center to the poles, or vice versa. Now, I have discovered that the converse of this is equally true; that the mechanical rotation of the bar occasions a continuous current of electricity flowing from the center of the bar to the poles, or from the poles to the center, according to the direction of the rotation.

An excited electro-magnet, or a helix of insulated wire through which a continuous current is passed, may be substituted for the permanent magnet.

A continuous current of electricity may also be induced upon a telegraphic circuit by the rotation of the conducting-wire in the neighborhood of a permanent magnet, or other body capable of inductive action by the rotation of the permanent magnet in the neighborhood of the conducting-wire, or by the revolution of the permanent magnet and conducting-wire around each other.

In illustration of my method of inducing a continuous current of electricity upon a telegraphic circuit, I shall show and describe one form of apparatus for producing the effect. I prefer to employ for this purpose a bar-magnet, N S, Figure 1, which can be caused to rotate upon its axis $a\ b$ by means which it is unnecessary to describe. A metallic spring, $c$, rests against the center of the permanent magnet N S. The instrument so constructed may be connected in circuit with a galvanometer, $g$, as in Figure 1. When N S is caused to rotate upon its axis $a\ b$, a continuous current of electricity traverses the circuit $c\ S\ b\ g\ c$. The needle of the galvanometer $g$ is deflected permanently so long as the rotation of N S is continued, and the deflection is reversed when the direction of the rotation is changed.

Figure 1:
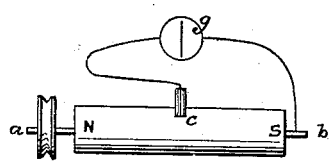
Figure 2:
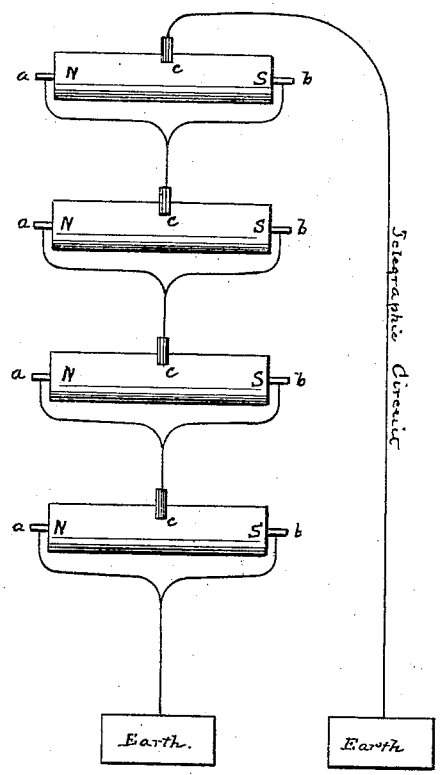
Figure 3:
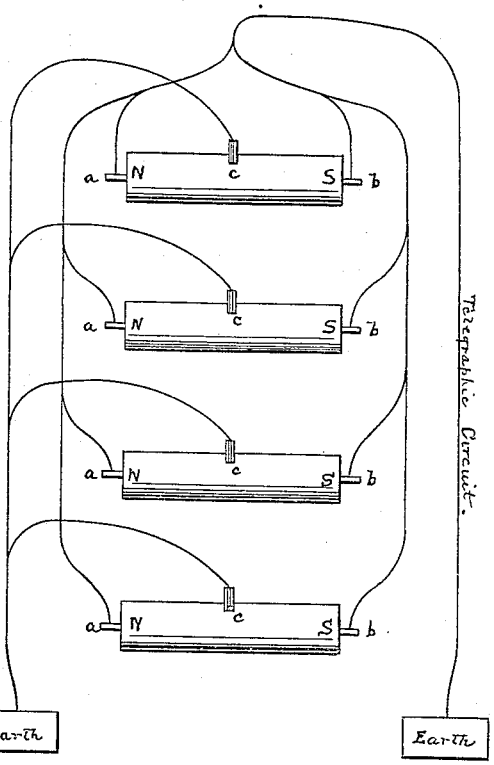
Figure 4:
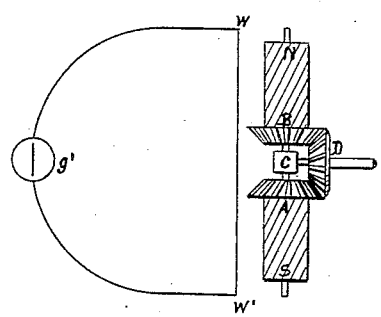

Figures 1 and 3 illustrate the combination of a number of rotating magnets to form an electro-magnetic battery for use upon telegraphic lines. In Fig. 2 the battery is arranged for intensity, and in Fig. 3 for quantity. In Figs. 1, 2, and 3, N S N S, &c., represent magnets, which are caused to rotate upon their axes $a\ b\ a\ b$, &c., the direction of the rotation being the same for all. Fig. 4 represents the manner in which a continuous current of electricity may be induced upon a closed circuit by the rotation of a permanent magnet in the neighborhood of the conducting-wire, or vice versa, or by the revolution of the one around the other. This figure represents one way in which this part of my invention may be carried into effect, viz., by the rotation of the magnet in the neighborhood of the conducting-wire.

N S is a permanent magnet, divided into two halves, N B and A S, which are magnetically united by an iron cog-wheel, D, fitting into the corresponding cog-wheels A and B. C is a central support for the axles of the cog-wheels A, B, and D, and it is made of a non-conducting material. When the cog-wheel D is made to rotate by means of suitable mechanism, rotation is also caused in the permanent magnet N S, the poles N and S turning in opposite directions.

The rotation of the poles N and S occasions currents of electricity in the neighboring conductor W W'. Since N and S turn in opposite directions, the currents induced by their rotation in W W' are in the same direction, and do not neutralize each other. The rotation of D thus occasions a continuous current of electricity upon the closed circuit W W' $g$ W, the needle of the galvanometer $g'$ being deflected to the right or left, according to the direction of the rotation of D.

The permanent magnet N S, Fig. 4, may be set in rotation in the interior of a hollow cylinder of copper, so as to obtain the full inductive action of the magnet all around; and the copper cylinders of a number of similar instruments may be united in series for quantity or intensity in an analogous manner to the arrangements shown in Figs. 2 and 3. The currents induced in the copper cylinders, and the currents induced in the rotating magnets themselves, may be thrown into the same circuit, so as to produce a maximum effect.

Having described my invention, what I claim, and desire to secure by Letters Patent, is—

1. The method of inducing a continuous current of electricity in a closed circuit by the rotation of a permanent magnet, or other body capable of inductive action, included in the circuit.

2. The combination of the conducting-wire, forming a closed circuit with a permanent magnet, or other body capable of inductive action, so that the rotation of the one in the neighborhood of the other shall induce a continuous current of electricity in the closed circuit.

In testimony whereof I have hereunto signed my name this 22d day of July, A. D. 1876.

A. GRAHAM BELL.

Witnesses:
CORNELIUS FINN,
BENJAMIN KIMBALL.